United States Patent
Beach et al.

(10) Patent No.: US 6,361,323 B1
(45) Date of Patent: Mar. 26, 2002

(54) SKILL ACQUISITION, TRANSFER AND VERIFICATION SYSTEM HARDWARE AND POINT TRACKING SYSTEM APPLIED TO HEALTH CARE PROCEDURES

(75) Inventors: Daryl Raymond Beach, 9-12-1210, Higashimikuni 3-chome, Yodogawa-ku, Osaka-shiga Osaka; Masato Miyahara, Kyoto, both of (JP)

(73) Assignees: J. Morita Manufacturing Corporation, Kyoto; Daryl Raymond Beach, Osaka, both of (JP)

( * ) Notice: Subject to any disclaimer, the term of this patent is extended or adjusted under 35 U.S.C. 154(b) by 0 days.

(21) Appl. No.: 09/539,793

(22) Filed: Mar. 31, 2000

(30) Foreign Application Priority Data

Apr. 2, 1999 (JP) ............................. 11-096398

(51) Int. Cl.[7] ............................................. G09B 23/28
(52) U.S. Cl. .................. 434/263; 434/262; 434/307 R; 434/365; 433/27
(58) Field of Search .................... 434/219, 262–265, 434/267, 270–272, 307 R, 308, 362, 365; 433/27, 77, 79, 22 P; 600/425, 587; 128/922; 345/156, 161, 184, 473; 348/78; 340/407.1; 108/145; 382/285, 294; 378/42, 207; 703/6

(56) References Cited

U.S. PATENT DOCUMENTS

| | | | | |
|---|---|---|---|---|
| 5,102,340 A | * | 4/1992 | Berlinghoff et al. | 434/263 |
| 5,433,613 A | * | 7/1995 | Berlinghoff et al. | 434/263 |
| 5,480,307 A | * | 1/1996 | Lang et al. | 434/263 |
| 5,688,118 A | * | 11/1997 | Hayka et al. | 433/27 |
| 5,766,016 A | * | 6/1998 | Sinclair et al. | 434/262 |
| 5,769,640 A | * | 6/1998 | Jacobus et al. | 434/272 |
| 5,805,140 A | * | 9/1998 | Rosenberg et al. | 345/161 |
| 5,947,743 A | * | 9/1999 | Hasson | 434/262 |
| 5,951,475 A | * | 9/1999 | Gueziec et al. | 600/425 |
| 6,088,020 A | * | 7/2000 | Mor | 345/156 |

* cited by examiner

Primary Examiner—Joe H. Cheng
(74) Attorney, Agent, or Firm—Koda & Androlia

(57) ABSTRACT

A system for use in skill acquisition, transfers and verification for performer has a simulated object, i.e., simulated head, to which the performer would perform clinical procedure. An image pickup, e.g., CCD camera, picks up an image of a point indicator provided on the performer or an instrument. Using the picked-up image, an image signal corresponding to the picked-up image is made. An image processor processes the image signal and generates data for showing a movement or tracks of the point indicator on a two-dimensional coordinate system. Thereby, a display shows tracks of the point indicator by using coordinate data.

12 Claims, 12 Drawing Sheets

Fig.12

| NO. | DATE | TIME (%) | | | | | | TOTAL PROCE- DURE TIME (min) | SKILL LEVEL |
|---|---|---|---|---|---|---|---|---|---|
| | | ARa1 (0) | ARa2 (1) | ARa3 (2) | ARb1 (0) | ARb2 (1) | ARb3 (2) | | |
| 1 | 1997.5.25 | 33 | 33 | 34 | 30 | 30 | 40 | 22 | 2 |
| 2 | 1997.6.25 | 40 | 30 | 30 | 45 | 40 | 15 | 22 | 1 |
| 3 | 1997.7.25 | 70 | 20 | 10 | 80 | 15 | 5 | 22 | 0 |

SKILL ACQUISITION, TRANSFER AND VERIFICATION SYSTEM HARDWARE AND POINT TRACKING SYSTEM APPLIED TO HEALTH CARE PROCEDURES

BACKGROUND OF THE INVENTION

The present invention relates to a structure and a method for deriving, testing and recording data to determine appropriate human positions, acts, space and human interface between others, human supports, instruments, devices, installations and health care facilities as a whole. The structure and method are especially useful for designing hospitals, clinics and associated centers for learning, for specifying health care procedures, for engineering information and treatment technology and for acquiring skills from the best use of one's body.

This system is based on the concept that data from proprioceptive feedback, scaled numeric terms and coordinate based imagery should be the primary way to define procedure, skill, instruments and settings for health care. Scaled numeric terms and coordinate based imagery also address indications for procedure and 3D perception of the beginning progress and outcome of procedure. The derivations from proprioceptive feedback (often conducted with masked eyes) best identify human interface with technological functions as a direct extension of human functions. This results in less clutter and the least distinction from patient centered attention.

Daryl Beach DMD, designed and developed the Skill Acquisition, Transfers and Verification system (SATV system) hardware and point tracking system applied to health care procedures with the engineering and manufacturing support of Kabushiki Kaisha Morita Seisakusho as an example of this method for widespread use in the field of health care at large. The example is focused on procedures in the mouth.

This system is based on a concept that, with proprioceptive derivation that is commonly shared by all human beings, everyone becomes aware of what he or she wants as a care provider as well as a care receiver. Thus, we become aware of the body conditions, technology and facilities that we want as human beings.

Briefly, the SATV system includes following seven stages:

SATV 0—Human centered derivations 0 (zero) conditions for "what I want" and "what we want" as providers and patient are derived for 1) body condition & acts, 2) human space & interface, 3) Settings, and 4) Technology.

Derivation exercises make the operator highly aware of such proprioceptive feedback as horizontal balance sense and minimum activity of anti-gravity muscles, with which each part of one's is stabilized.

SATV 1—Positions, Contacts, Sighting (Simulation)

The optimum treatment condition including body conditions, positions, contacts, sightings and compatible technology can be derived for all procedures in dentistry including examinations, restorations, prosthetics, endodontics, periodontics, oral srugery, orthodontics, etc., while maintaining a balanced head, optimum finger control, minimum body tension for performers and patients with minimum distraction from patients.

SATV 2—Basic Finger Control and Accuracy (Simulation)

Basic finger control and sighting control based on criteria for direct views and reflected views are acquired with the stable body conditions. Exercises reinforce memory sets that were established in Stages 0 and I.

SATV 3—Skill Transfer (Simulation)

Skills that are acquired in Stage 0, I and II are transferred through exercises to any or all other procedures in dentistry. For example, to surgical procedures which may include removal of horizontally impacted upper third molars simulated to acquire the optimum body conditions and positions.

SATV 4—Patient, Performer, Assistant Roles (Simulation)

Through role simulation exercises, proprioceptively derived clinical settings are verified. Interpersonal skills are also acquired in pd settings.

SATV 5—Patient Treatment (Clinical)

The outcome of patient treatment is photographed with an intra-oral camera and the image is displayed on the LAN display. The images are assessed by oneself first, and then by others.

SATV 6—Patient Communication (Clinical)

Communication with patients including Information collection and is assessed through images of CCD-camera and voice recording.

The SATV system provides following benefits:

(a) to establish and maintain optimum finger control for precision work;

(b) to minimize distraction from the patient;

(c) to maintain a healthy spine of the operator, while minimizing physical tension;

(d) to maintain consistent accuracy, and minimize treatment time by eliminating unnecessary acts; and (e) to establish a basis of infection control by minimizing the number of finger-instrument contacts.

In the meantime, the purpose of SATVs 2 to 5 are to provide the performers (i.e., dentist, physician, nurse and assistant) with consistent accuracy, minimum treatment time, minimum numbers of finger-instrument contacts, and to reinforce muscle memory sets established in SATVs 0 and 1. For this purpose, a conventional equipment for use in SATV 2 for performer includes a simulated head, mouth, jaws, teeth, tissues and pathologies (PCT) with which the performer performers dental procedures. The PCT has simulated head and face, articulator, buccal membrane (silicon rubber), cheek and lip mask and dental arch model. A CCD camera is assembled over the PCT for picking up actual movements of portions of the performer and instrument that the performer uses in a procedure. An image picked up by the CCD camera is transmitted and then displayed on a monitor screen. The monitor screen is covered with a releasable transparent sheet, so that an assistant can track the movements of the portions of both the performer and the instrument. With the transparent sheet on which the actual movement has been tracked, the performer can evaluate his/her performance. In the evaluation, because it has been found that a highly skilled performer requires minimum movements of body as well instruments during procedure, one of the most important factors is a size of the tracked movement on the transparent sheet.

With this equipment, however, a greater experience is needed for precisely tracking the movement of portions of the body and instrument on the transparent sheet. Also, a plurality of portions of body and/or instrument can not be tracked simultaneously on the transparent sheet, which results in that a greater time is required for tracking a plurality of portions. Further, an improvement of skill can not be evaluated quantitatively.

SUMMARY OF THE INVENTION

Among the several objects and features of the present invention may be noted the provision of a; system and method for use in SATVs 2 to 5 capable of precisely tracking paths of motion of points on a performer and/or a portion of an instrument during a procedure; the provision of such a system and method which is capable of automatically tracking the movement without any assistant; and the provision of such a system and method which allows a performer to evaluate his/her acquired skill more easily and quantitatively.

Accordingly, a system for use in skill acquisition, transfers and verification for performer according to the embodiment of the present invention includes (a) a simulated object to which the performer would perform clinical procedure;

(b) an image pickup which picks up an image of a point indicator provided on the performer or an instrument that the performer handles, and then generates an image signal corresponding to the picked-up image, while the performer provides the simulated object with the procedure;

(c) an image processor which processes the. image signal generated by the image pickup and generates data for showing a movement of the point indicator on a two-dimensional coordinate system; and (d) a display which shows tracks of the point indicator by using the coordinate data.

With this arrangement, the motions of the performer and instrument .be accurately tracked, and also, such motions can be automatically tracked without any help of others.

In another aspect of the system according to the present invention, the system further comprises at least one light source which directs light toward the simulated object. With this arrangement, the motion of the performer and instrument can be captured clearly due to the light. Also, the visual recognition of a simulated object such as medical site is improved, creating an environment resembling an actual health care site using shade-free light.

Another system according to the present invention includes (a) a simulated object to which the performer would perform clinical procedure;

(b) at least one light source which directs light to the simulated object;

(c) a position indicator made of light reflecting material, the position indicator being provided on the performer or an instrument that the performer handles for reflecting the light from the light source;

(d) an image pickup which picks up an image of a point indicator and then generates an image signal corresponding to the picked-up image while the performer provides the simulated object with the procedure;

(e) an image processor which processes the image signal generated by the image pickup and generates data for showing tracks of the point indicator on a two-dimensional coordinate system; and (f) a display which shows the tracks of the point indicator by using the coordinate data. With this system, the reflective point indicator provides a good and precise tracking of the point indicator applied to the performer and the instrument handled by the performer.

In another aspect of the system according to the present invention, the image pickup is a video camera, and the image-processor is a video processor which processes the image signal and generates binary data corresponding to the tracks of the point indicator and generates data for showing the tracks of the point indicator on the two-dimensional coordinate system by using the binary data. With this arrangement, a general-purpose video camera can be used and the coordinate can be calculated in a reduced time, so that a capacity of memory used for storing data can be decreased.

Another system according to the present invention includes a base;

an elevating portion supported on the base so that the elevating portion moves ups and downs on the base;

the elevating portion carries the simulated object and a holding member equipped with light source, image pickup and the instrument holder, so that the light source, the image pickup and the instrument holder moves ups and downs with the elevating portion.

With this arrangement, the simulated object and the holding member can be moved ups and downs simultaneously, so that no adjustment should be made which would otherwise be needed in the vertical movements.

In another aspect of the system according to the present invention, the system includes a chair having an arm horizontally extending from a vertical line passing through a mouth in the simulated object supported on the elevating portion and supported rotatably about the vertical line, and a seat mechanically connected with the arm so that the seat moves ups and downs relative to the arm and to and from the vertical line, wherein the chair cooperates with the base to define a space therebetween in which the performer on the seat can move his/her feet freely.

In another aspect of the present invention according to the present invention, the system includes a controller which controls an elevation of the elevating portion and the instruments that the performer handles;

a head rest rotatably mounted about a horizontal axis for supporting the simulated object; and means for displaying and/or memorizing the elevation of the elevating portion, a rotational angle and horizontal and vertical movements of the seat, and a rotational angle of the headrest.

With this arrangement, the conditions of the previous procedure can be readily reproduced when the same performer does a next procedure. Further, by recording the conditions of the procedure, the performer can compare and evaluate which conditions will draw good results.

In another aspect of the system according to the present invention, the light source has two lamps mounted over the simulated object so that the two lamps direct light to the mouth of the simulated object from opposite directions;

the image pickup is positioned between the two lamps.

With this arrangement, the instrument that the performer handles can be picked up by the image pickup from such an angle, which causes the clearest observation of the motion of the instrument.

A method for use in skill acquisition, transfers and verification for performer comprises the steps of:

(a) providing a simulated object to which the performer would perform clinical procedure;

(b) picking up an image of a point indicator provided on the performer or an instrument that the performer handles, and then generating an image signal corresponding to the picked-up image, while the performer provides the simulated object with the procedure;

(c) processing the image signal generated by the image pickup and generates data for showing a track of the point indicator on a two-dimensional coordinate system; and (d) displaying the track of the point indicator by using the coordinate data.

With this method, the motions of the performer and the instrument can be accurately tracked. Also, such motions can be automatically tracked without any help of others. Further, the performer can readily and quantitatively evaluate his/her skill.

In another aspect of the method according to the present invention further comprises the steps of:

storing data of a frame in a first memory;

displaying the frame;

moving the frame to superimpose the frame on the tracks of the point indicator;

calculating a ratio of the time in which the point indicator is within a region corresponding to the frame to a time taken in picking up the point indicator; and displaying the ratio.

With this method, the performer can evaluate his/her skill based on objective data obtained by visually confirming the motions of the performer and the instrument.

In another aspect of the method according to the present invention, the frame on the display has a plurality of windows having the same center but different sizes so as to stepwise evaluate procedures made by the performer, wherein the ratio of the time while the tracks the point indicator stay within each of regions enclosed by the plurality of windows to the time taken in picking up the point indicator is calculated and then displayed. With this method, the stepwise evaluation of the motions of the performer and the instrument can be made.

In another aspect of the method according to the present invention, the plurality of ratios for the plurality of performers are stored in a second memory, and the plurality of the ratios stored in the second memory are displayed. With this method, the performer can visually confirm his/her skill with reference to the evaluation results indicated on the display.

Other objects and features of the present invention will be in part apparent and in part pointed out hereinafter.

BRIEF DESCRIPTION OF THE DRAWINGS

A preferred embodiment of the invention is described below by referring to the drawings in which:

FIG. 12 is a table of evaluation results indicated on the display together with the tracks of the markers and the like;

Corresponding reference characters indicate corresponding parts throughout the several views of the drawings.

DETAILED DESCRIPTION OF THE PREFERRED EMBODIMENTS

Figure 1:
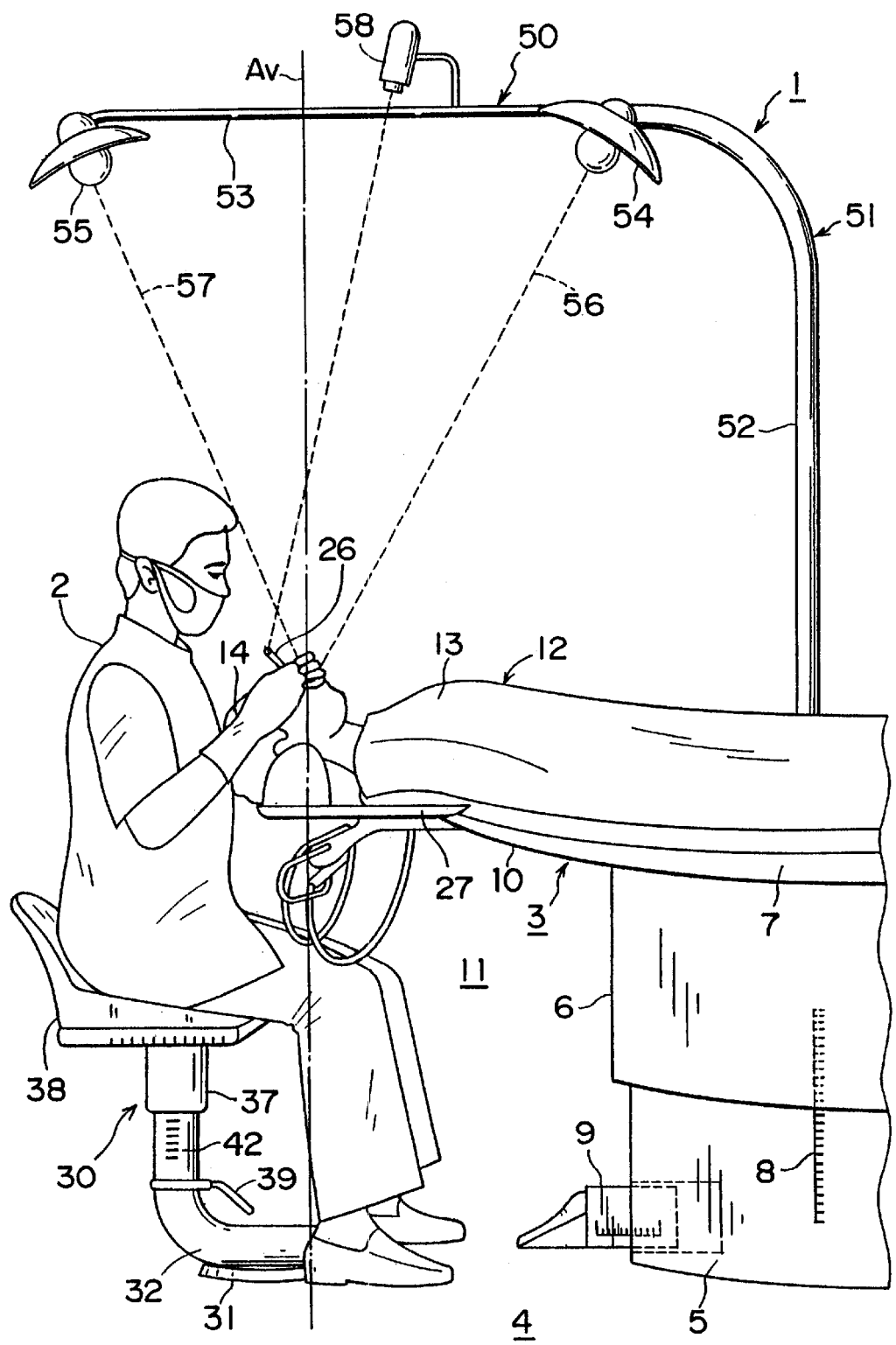
FIG. 1 is a perspective view of a system for use in clinical procedures according to the present invention.

Referring to FIG. 1, there is shown a system, generally indicated by reference numeral 1, for use in SATV 2 according to the present invention. The system 1 includes several portions necessary for a performer, i.e., dental student or practitioner, to perform certain procedures. For example, the system 1 has a table 3 which comprises a base 5 secured on a floor 4 of a procedural room, an elevator 6 fitted around the base 5, and a support plate 7 fixed on top of the elevator 6. The elevator 6 is designed to move vertically around the base 5 by a driving means such as pneumatic or hydraulic cylinder not shown.

Preferably, the system 1 has an arrangement for the performer 2 to visually observe the elevation of the elevator 6 moving ups and downs relative to the base 5. The arrangement may be either mechanical or electro-mechanical structure. For example, the elevator 6 in the table 3 is in the form of cylinder which is telescopically fitted around the upper portion of the base 5. Further, a skill scale 8 for indicating an elevation is provided on the outer side surface of the base 5. Preferably, the skill scale 8 is positioned within the performer's field of view as shown in FIG. 1. This allows the performer 2 to take a glance at the skill scale 8, thereby recognizing the height of the elevator 6 and support plate 7.

Alternatively, the elevation of the elevator 6 may be detected electrically using a suitable detector and, if necessary, the elevation may be indicated on a suitable display such as LCD. For this purpose, a rack and pinion mechanism well known to the art can be used. In this instance, for example, a rack is provided on either the base 5 or the elevator 6, and a pinion which meshes with the rack is mounted on the other side. A detector, e.g., an encoder, may be provided to electrically detect the rotational rate of the pinion. The rotational rate of the pinion detected by the detector, corresponding to the elevation of the elevator 6, is indicated on the display. Instead, the displacement of the piston of a cylinder for lifting or lowering the elevator 6 may be detected and, by using the displacement, the elevation can be determined and then displayed on the display. The detected elevation may be stored in a memory such as Read Only Memory (RAM) described later.

The movement of elevator 6 is controlled by a foot controller 9 arranged on the floor 4 adjacent to the table 3. The foot controller 9 has various switches including an elevation control switch for controlling the elevation of the elevator 6. The performer 2 can operate the elevation control switch by his/her tiptoe for elevating the elevator 6 in the process of procedures as shown in FIG. 1.

One end of the support plate 7 is extended horizontally by a certain length from the elevator 6 toward the performer 2 to form an extension 10 which defines a space 11 below the extension 10. This allows the performer 2 on a chair to move his/her feet and also operate the foot controller 9 freely.

Figure 3:
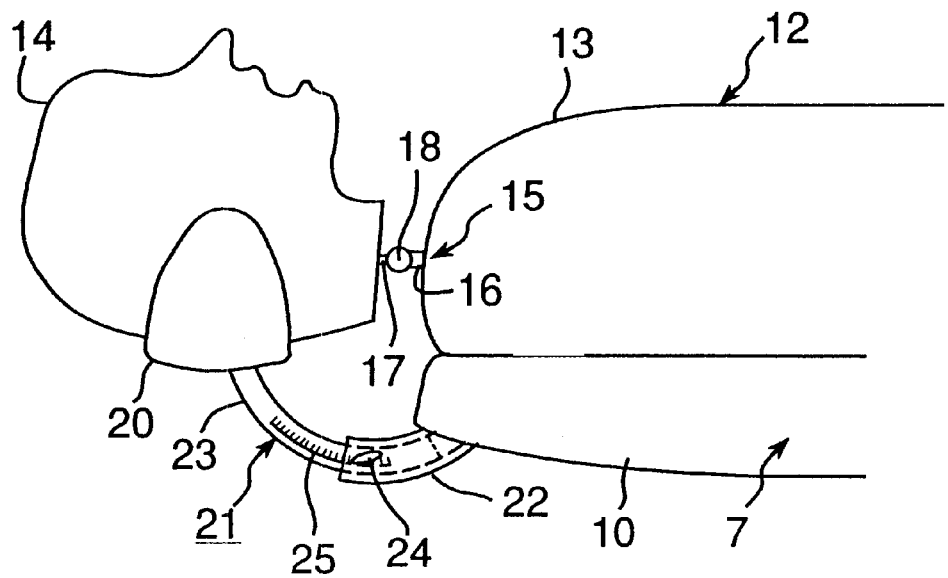
FIG. 3 is a side view of a PCT, a headrest, and a linkage of the headrest.
Figure 4:
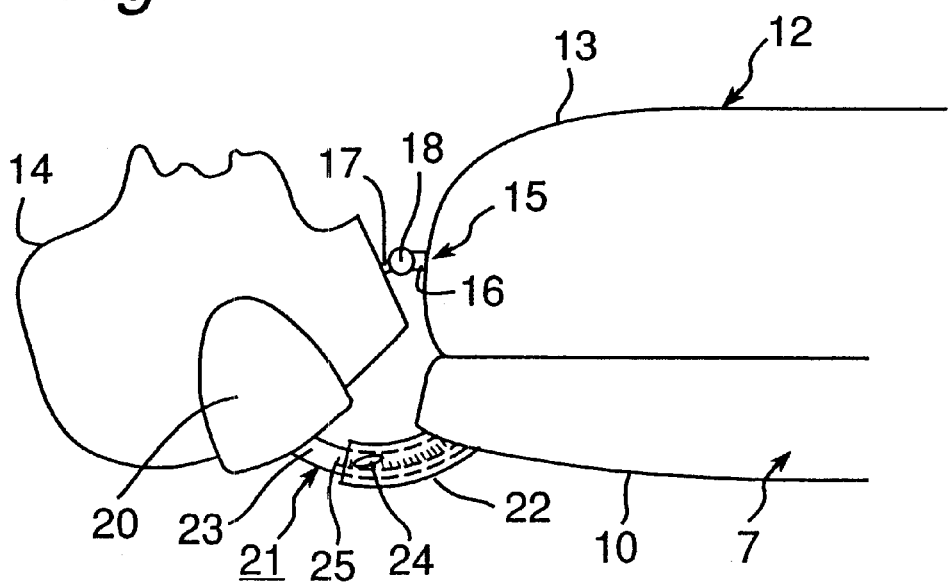
FIG. 4 is a side view of the PCT, the headrest, and the linkage of the headrest, wherein the head of the PCT shown in FIG. 3 is turned.

As best shown in FIGS. 3 and 4, mounted on the table 3 is Pre-clinical Phantom (herein after referred to as "PCT") 12 having various parts which simulate object, e.g., the upper half of a human body including trunk 13, head 14 and neck 15 connecting between trunk 13, head 14. The neck 15 has a first connection arm 16 extending from the trunk 13 to the head 14, a second connection arm 17 extending, on the contrary, from the head 14 to the trunk 13, and a joint 18 for rotatably connecting the first and second connection arms 16 and 17. In this embodiment, the joint 18 has a pin which orthogonally intersects the horizontal body axis of the PCT, allowing the head 14 to rotate about the horizontal pin in the fore and aft direction relative to the trunk 13.

Actual health care procedure may require the patient to rotate his/her head around his/her body axis. For this requirement, the joint 18 may be a universal joint, causing the head 14 to rotate around the boxy axis relative to the trunk 13. In this regard, the joint 18 may be provided with a skill scale so as to detect a rotational angle of the head 14 relative to the trunk 13. The detection is electrically carried out by a suitable detector. In this instance, the rotational angle detected may be displayed on a suitable display and/or stored in a memory.

In order to support the head 14, a headrest 20 is arranged on the support plate 7, adjacent to the performer 2. The headrest 20 is connected to the support plate 7 through a linkage 21 positioned below the PCT 12 so that the head 14 can rotate in the fore and aft direction. The linkage 21 includes two members, a guide shaft 22 and a guide rod 23, both curved along a circle in a vertical plane crossing the horizontal joint 18. The circle should have its center at the joint 18. The guide shaft 22 is made of curved tube with one end thereof fixed to the support plate 7. On the other hand, the guide rod 23 is fixed at one end thereof to the headrest 20 with the opposite end inserted releasably into the free end of the guide shaft 22. The guide rod 23 can be secured to the guide shaft 22 by hand, for example, simply by fastening a screw 24 with a lug into a tapped through hole which is formed in the peripheral wall of the guide shaft 22 and pressing the tip end of the screw onto the guide rod.23.

Referring again to FIG. 3, the outer peripheral surface of the guide rod 23 may have a skill scale 25 marked at a portion within the view of the performer 2. This scale 25 allows the performer 2 to know the height of the headrest 20 and its angle around the joint 18. Alternatively, a detector for mechanically, electrically or acoustically detecting the moving distance of the guide rod 23 may be provided, and the detected result may be indicated on the display and/or stored in the memory. In another case where the movement of the head rest 20 is controlled by driving means such as motor or cylinder, the angle of the head rest 20 may be determined from the rotating rate of a motor or the moving distance of a cylinder.

Referring back again to FIG. 1, an instrument holder 27 or a table is arranged adjacent to the support plate 7 for holding or placing various instruments 26 that the performer 2 uses in the procedures. There are various kinds of instruments 26. Some of the instruments 26 are connected to a pressurized-air supply or compressor (not drawn), so that they are supplied with pressurized air as a driving force from the compressor. The pressurized air supplied is controlled by the performer's foot operation of the foot controller 9.

Figure 5:
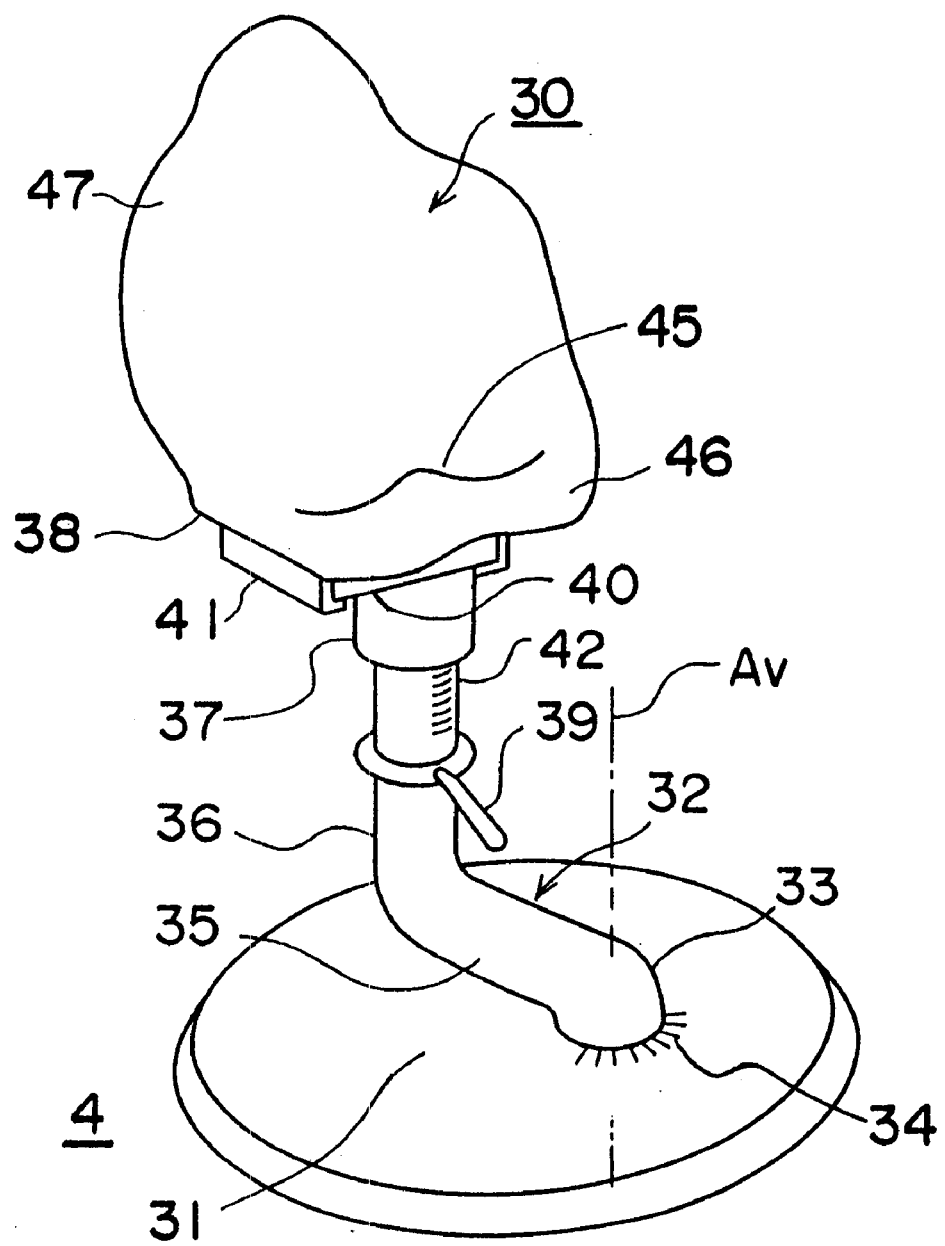
FIG. 5 is a perspective view of a chair secured in the system for medical procedure.
Figure 6:
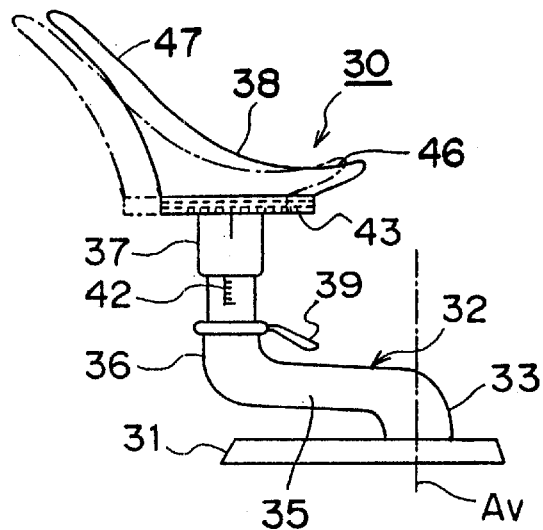
FIG. 6 is a side view of the chair shown in FIG. 5, showing the fore and aft motion of the seat.
Figure 7:
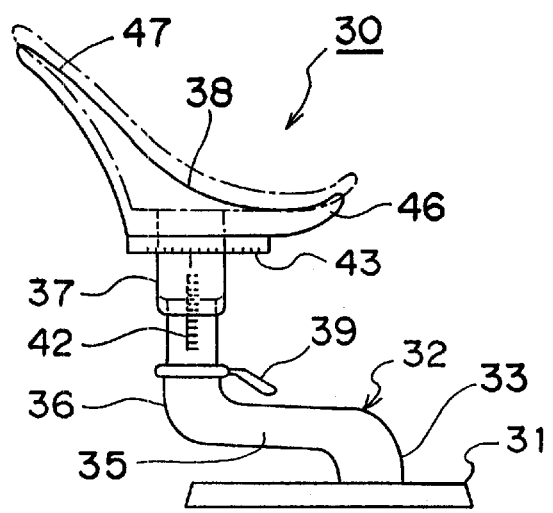
FIG. 7 is a side view of the chair shown in FIG. 5, showing the vertical motion of the seat.

Referring to FIGS. 3 to 5, there is shown a chair 30 on which the performer 2 can seat. The chair 30 includes a base 31 secured on the floor 4 and a support shaft 32 connected at its one end to the base 31. The support shaft 32 has a portion 33 extending vertically extending portion 33 and connected to the base 31. The central axis of the vertical portion 33 coincides with a vertical line Av passing through the mouth of the head 14 of the PCT (see FIG. 1) so that the chair 30 rotates about the vertical line Av.

Referring to FIG. 5, another skill scale 34 is marked on the lower end of the support shaft 32 and the base 31, respectively, -so as to indicate the rotational angle of the support shaft 32, i.e., the direction of the chair .30, so that the performer can visually observe the direction of the chair 30. The direction of the chair 30 may automatically be detected by a suitable rotational angle detector mounted on the base 31 and/or the support shaft 32. Also, the direction, i.e., a rotational angle of the support shaft 32, may be on the display or storing it in the memory.

The support shaft 32 includes a horizontal portion 35 extending horizontally and connected at its one end to the upper end of the vertical portion 33, and an upper vertical portion 36 extending vertically and connected to the opposite end of the horizontal portion 35. The support shaft 32 may be made by assembling several parts corresponding to those portions 33 to 36 or simply by bending a single tube. A telescopic lifting cylinder 37 is fitted around the upper vertical portion 36, and a seat 38 is mounted on the lifting cylinder 37. The telescopic motion of the lifting cylinder 37 is caused by operating an operation lever 39 provided on a suitable position of the chair 30, e.g., on the upper vertical portion 36 in this embodiment. The seat 38 is designed to move in a direction parallel to the horizontal portion 35, i.e., in the fore and aft direction. For this purpose, a rectangular plate 40 (shown in FIG. 5 only) is mounted on the upper end of the lifting cylinder 37 so that a pair of parallel side edges of the plate are directed to the fore and aft direction, i.e., the direction in parallel to the horizontal portion 35, and brackets 41 for guiding the pair of parallel side edges are mounted on the bottom surface of the seat 38.

Another skill scale 42 is marked on the upper vertical portion 36 so as to indicate the height of the seat 38, and likewise, skill scale 43 is marked on the rectangular plate 40 and the bracket 41, respectively, so as to indicate the fore and aft position of the seat 38. The height and the fore and aft position of the seat 38 may automatically be detected and indicated on a display and/or stored in the memory. For such automatic detectors, the foregoing detector for detecting the elevation of the elevator 6 can be used.

The seat 38 has a rectangular seat plate 45 for supporting the performer 2. The seat 38 further includes a curved portion 46 curved upward and outward from the front portion and side portions of the seat plate 45, and a back portion 47 extended upward from the rear portion of the seat plate 45. This allows that the performer 2 is always positioned on the chair 30 in position. The seat plate 45 is not limited to rectangle, but it may be in any configuration provided that it can position the performer 2 in place on the seat plate.

Referring back again to FIG. 1, there is shown an image pickup device 50 for picking up the images of the performance by the performer 2 engaging with certain procedures. The image pickup device 50 is supported by a support frame 51. The support frame 51 includes a vertical rod 52 and a horizontal rod 53 extending horizontally from the upper end of the vertical portion 52. The lower end of the vertical rod 52 is fixed to a peripheral portion, e.g., the left side, of the elevator 6 or the support plate 7. The horizontal portion 53 is curved toward a direction so that it intersects the vertical line Av. This causes the free end of the horizontal rod 53 to position above the opposite side, e.g., the right side of the elevator 6 or the support plate 7. The horizontal rod 53 of the support frame 51 is equipped with a light source having two lamps 54 and 55, positioned on opposite sides of the vertical shaft Av. Also, optical axes 56 and 57 of the lamps 54 and 55 are diagonally directed to the mouth of the head 14 of the PCT. Preferably, one optical axis 56 of the lamp 54 on one side defines an angle of about 30° with the vertical line Av, the other optical axis 57 defines an angle of about 20° with the vertical line Av. The support frame 51 carries an image pickup device, preferably an infrared CCD camera 58, between lamps 54 and 55. The camera 58 is focused on the head 14 of the PCT.

With this arrangement, since the device 50 is fixedly mounted on the elevator 6 or support plate 7, when the performer 2 operates the foot controller 9 to lift or lower the elevator 6, the image pickup device 50, the PCT 12 and the instrument holder 27 simultaneously moves vertically. This in turn ensures that, even when the performer 2 moves to adjust the height of the PCT 12, the focus of the camera 58 is retained on the head 14 and also the distance between the camera 58 and the PCT 12 is kept unchanged.

Figure 2A:
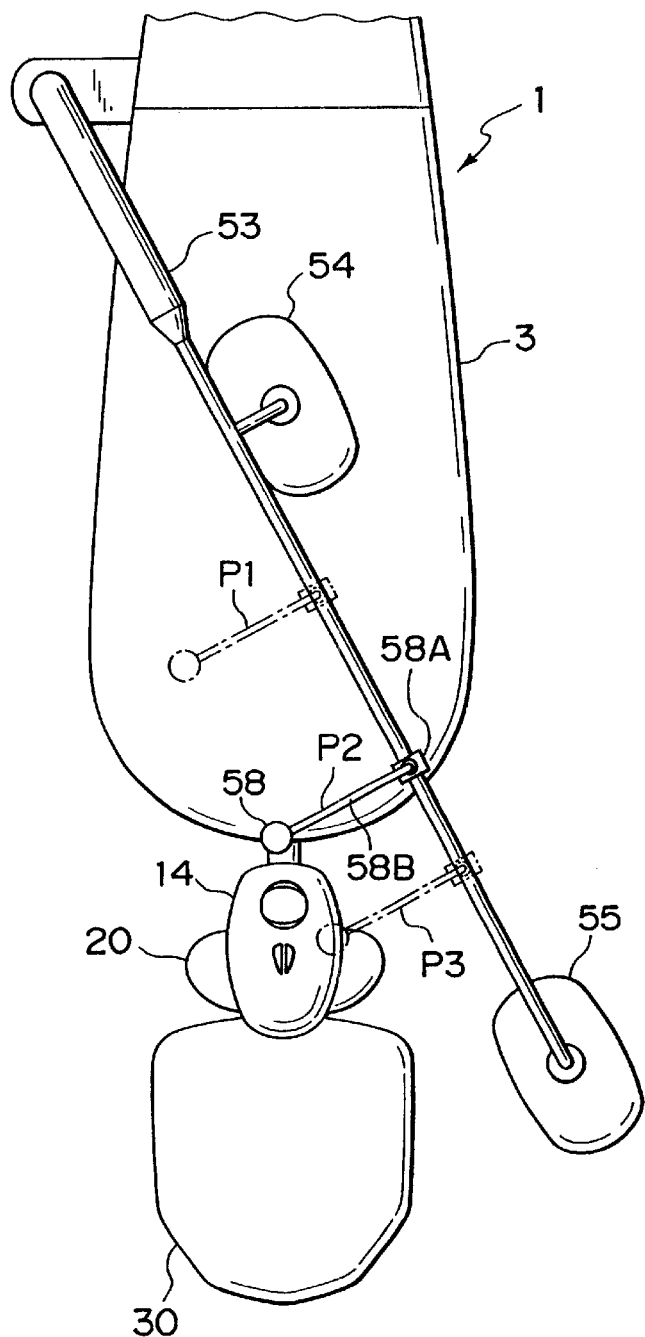
FIG. 2A is a plan view of the system of another embodiment in which a camera can be moved.
Figure 2B:
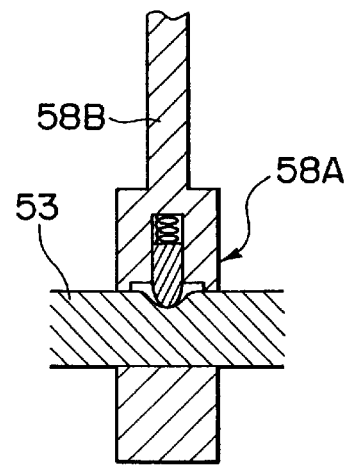
FIGS. 2B to 2C are sectional views of connectors for connecting the camera to a horizontal rod for movably supporting the camera.
Figure 2C:
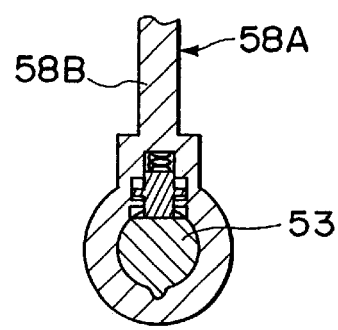

It should be noted that, as shown in FIGS. 2A to 2C, the camera 58 may be slidably supported on the horizontal rod 53 using a connecting mechanism 58A. In FIG. 2A, the reference numerals P1 to P3 shows respective positions where the camera picks up image of maxilla, maxilla and mandible, and mandible. The connecting mechanism 58A may have a horizontal arm 58B slidably connected with the horizontal rod 53.

Before procedure, a suitable PCT 12 is selected according to the procedures. The head 14 is also selected according to the procedures. The selected head 14 is connected to the trunk 13 previously laid on the support plate 7. Also, a denture piece suitable for the procedures may be fitted in the head 14. Then, the performer 2 sits on the chair 30, and moves himself/herself and, if necessary, PCT 12 to a position where the performer can take a suitable access to the PCT with the most relaxed conditions. In this instance, the performer 2 adjusts the direction and height of the chair 30 and the distance between the chair and the vertical line, i.e., the distance from the PCT. Also, the performer 2 may control the height of the PCT 12 by operating the foot controller 9, and adjust the height (inclination) of the head 14 by using screw 24 of the mechanism 21. If necessary or possible, the performer 2 turns the head 14 laterally relative to the body axis. If possible, the headrest 20 is adjusted automatically by the foot controller 9. In this adjustment, it is preferable to determine the position including the height of the PCT 12 and the chair 30 according to the data of proprioception obtained in SATV 0.

The performer or the assistant may read several values from respective skill scales, and store them on a memory. The values include the height of the PCT 12 or the support plate 7, the inclination of the head 14, and the height, direction and distance of the chair 30 which have been determined. In the arrangement having detectors for the skill scales, the detectors transmit respective signals. The signals are then processed to obtain those values which are then stored in the memory. The values can be used in various ways. For example, when the performer 2 is to perform the same procedure, the conditions used in the previous procedure can easily be provided to the system and performer. Of course, it is also possible to set the system in certain condition different from that previously used, as desired.

Figure 8:
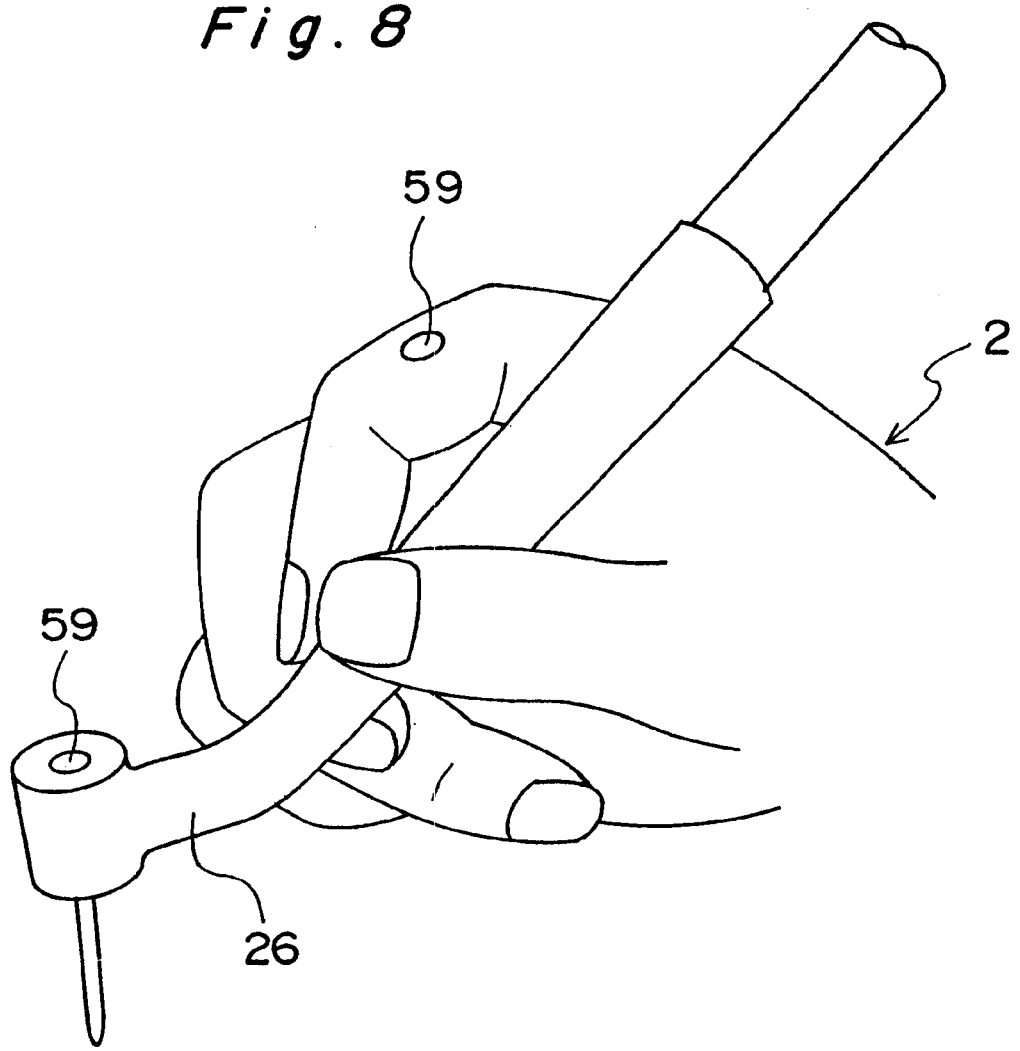
FIG. 8 is a perspective view of the hand of performer gripping an instrument to which markers are applied.

The performer 2 turns on the lamps 54 and 55 before or after the above adjustments such as height, and selects a instrument 26 suitable for the procedure. Also, as shown in FIG. 8, a patch or a marker 59, or point indicator, is applied to the instrument 26 or the performer's operating the instrument 26 for a point tracking described below. A position where the marker 59 is applied with is not limited to this, and it is suitably selected according to the procedure.

After the completion of the preparation, the performer 2 starts the procedure, and the assistant simultaneously turns on the switch of the camera 58 to pick up the movement of the marker 59. The picked-up images are processed by a data-processing system (see FIG. 9) as will be described later, so that the motion of the marker 59 is shown on the display.

Figure 9:
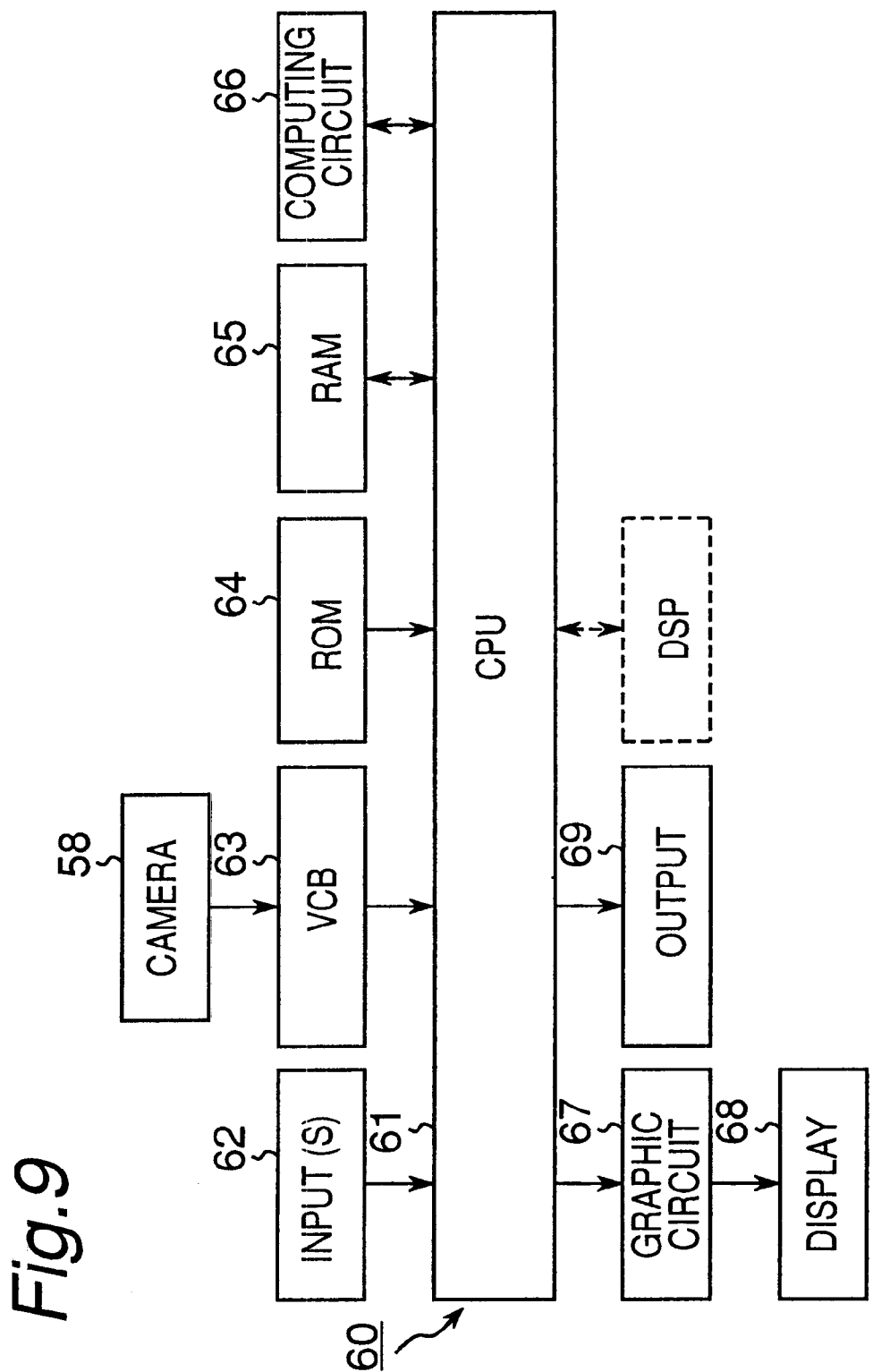
FIG. 9 is a block diagram illustrating a data processing system provided to the system for medical procedures of the present invention.

FIG. 9 is a block diagram of the data-processing system 60. As shown in the block diagram, the data-processing system 60 includes a central processing unit (CPU) 61 or microcomputer. The central processing unit 61 has various inputs 62 connected thereto. These inputs 62 may include other computers connected to this system via a transmitting devices such as communication cable, other than keyboard, mouse, voice inputting device and the like. The data input from the keyboard and the like include, for example, personal information of the performer (e.g., name and proprioception), and the date, procedure and conditions (e.g., the proprioception data, the height of the chair, etc.). In this regard, when the height of the table 3, the height, direction and fore and aft position of the chair 30, the inclination of the head 14 and the like are automatically detected by the corresponding detectors, the values detected by these detectors may be directly input through the input 62.

The camera 58 is connected to the central processing unit 61 via a video capture board 63 (or VCB). The VCB 63 converts the output from the camera 58 into digital image data, and also converts the digital image data into binary image data (the image data of the marker 59 and image data other than that of the marker). The VCB 63 further converts the image data of the marker 59 into X-coordinate data and Y-coordinate data. The X-coordinate data and the Y-coordinate data may be simply referred to as "X-Y coordinate data" as required.

There are various possible methods to distinguish the image data of the marker 59 from other image data. For example, an infrared reflection sheet is used for the marker 59 and an infrared camera is used for the camera 58. Thus, the infrared camera selectively catches light reflected from the infrared reflection sheet, thereby readily separating the image of the marker 59 from other images. In case where a plurality of markers 59 are used at the same time as shown in FIG. 8, they may be made from different materials having different properties including reflective wave-length and color. In this instance, preferably the VCB 63 has a separation circuit having a plurality of threshold values for separating images of the marks. This allows that the digital image data is converted into several image data corresponding to the respective markers 59. The X-Y coordinate data thus generated for each marker is fed to the central processing unit 61 and then stored in RAM 65. The marker 59 is not limited to the infrared reflection sheet, but it may be other material such as a self-luminous electric bulb, a light-emitting element or the like.

ROM 64 stores programs for automatically evaluating the results of procedure and data necessary for executing the evaluation programs as will be described later. This data includes frame data which will be described in detail below.

The RAM 65 stores the coordinate data generated in the VCB 63, the results (i.e., evaluation data) evaluated by an evaluation program, condition data such as experimental conditions entered from the inputs 62 (e.g., the keyboard), and the X-Y coordinate data output from the VCB 63.

The computing circuit 66 provides a score of the result of the procedure according to the evaluation program stored in the ROM 64 in a manner as described below, using the coordinate data stored in the RAM 65 and a frame data stored in the ROM 64.

An imaging or graphic circuit 67 generates tracking data of the marker 59 to be shown on the display 68, from the coordinate data stored in the RAM 65. The imaging circuit 67 also generates frame image data to be shown on the display together with the tracking data, from the frame data.

An output 69 is a printing machine such as a printer or the like. The output 69 may include other computers or the like connected thereto via communication cable.

Figure 10:
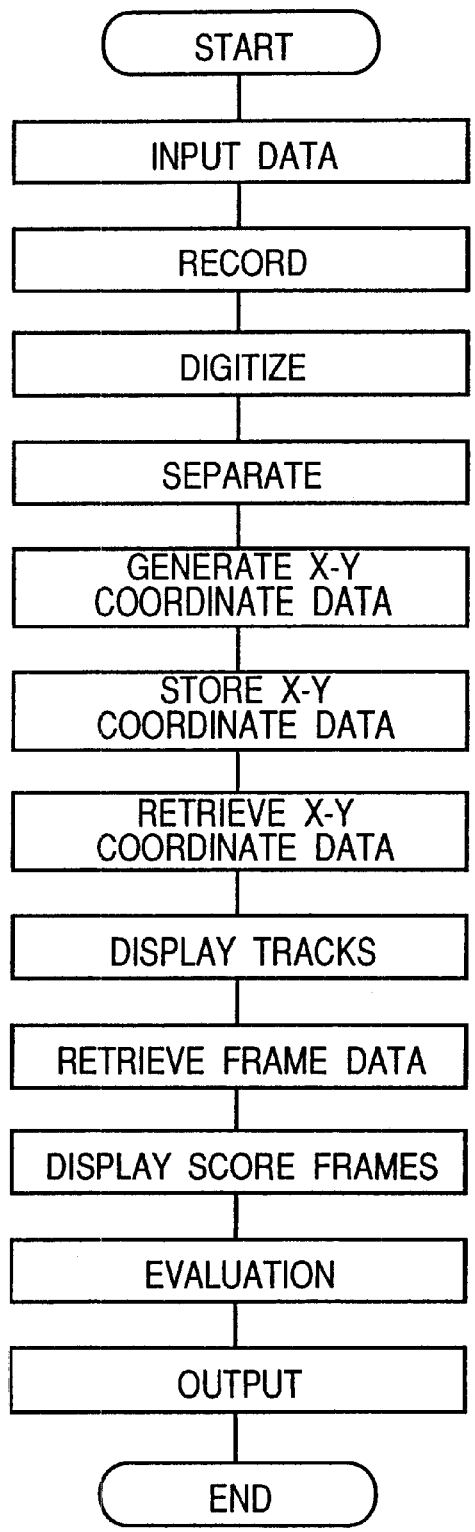
FIG. 10 is a flowchart illustrating the control of the data processing system.
Figure 11:
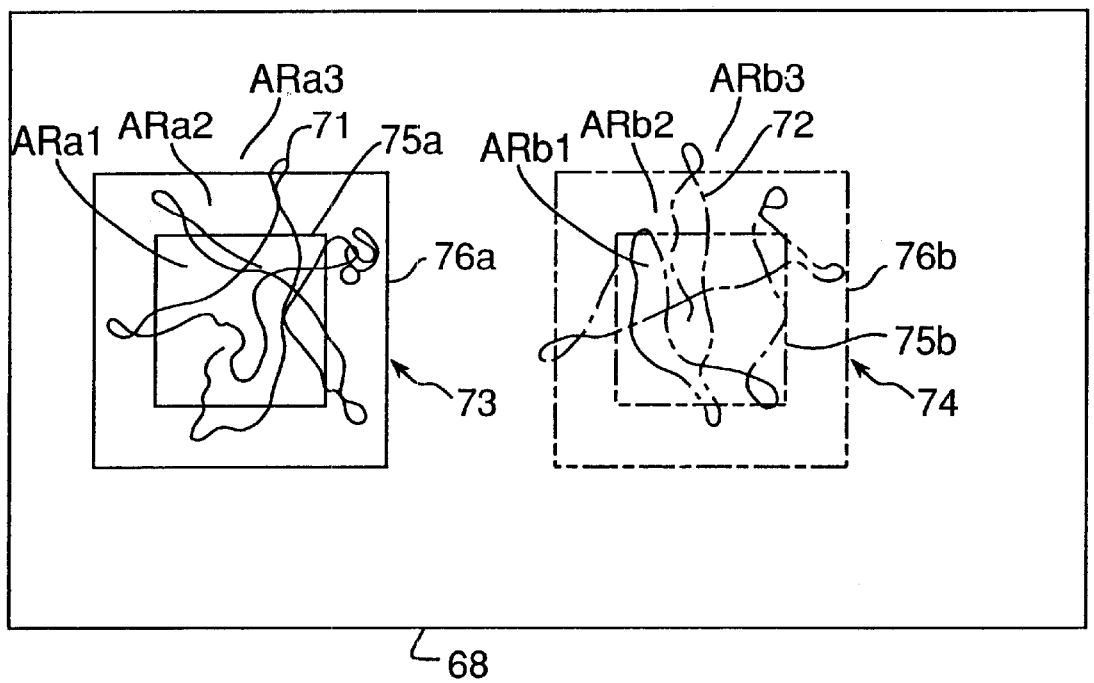
FIG. 11 shows tracks of the markers which are shown on the display, and skill frames for evaluating the procedure.

Referring to FIGS. 9 to 11, an operation of the data-processing system 60 thus arranged will be described. The assistant or the performer operates the keyboard or the like of the input 62 and stores the input data (i.e., the conditions for procedure, the procedure and the like) in the RAM 65. The RAM also stores the results of the procedures made in the past. Next, a procedure is started as described above, and the process of the procedure is continuously picked up by the camera 58. The camera 58 outputs a signal corresponding to the captured image to the VCB 63. The VCB 63 digitizes the output signal from the camera 58. The VCB 63 then separates the digitized image data into the digital image data of the marker 59 and other image data. When using a plurality of markers 59, image data is separated into the digital image data of the respective markers 59 and other image data. Then, the VCB 63 generates X-Y coordinate data corresponding to each of the markers 59. The generated X-Y coordinate data is stored in the RAM 65 and is retrieved as required.

After the completion of the procedure, the evaluation of the procedure is commanded through input 62 such as the keyboard, and then, the central processing unit 61 retrieves the X-Y coordinate data from the RAM 65 and sends it to the imaging circuit 67. The imaging circuit 67 generates tracking data of the markers 59 based on the X-Y coordinate data and shows tracks 71 and 72 corresponding to the tracking data on the display 68 (see FIG. 11). Next, the central processing unit 60 retrieves the frame data stored in the ROM 64 and then sends it to the imaging circuit 67. The imaging circuit generates image data corresponding to the frame data in the same manner as in the X-Y coordinate data and displays skill frames 73 and 74 or windows, e.g., concentric double rectangles, on the display 68 as shown in FIG. 11. It should be noted that, in this embodiment, although two pairs of tracks and frames are displayed at the same time, only one pair of which can be displayed selectively on the display.

The skill frames 73 and 74 can be moved upward or downward, or to the right and left, independently using the mouse or the keyboard on the display so that the frames 73 and 74 are superimposed on respective tracks 71 and 72 to surround the tracks as much as possible. If necessary, each size of the skill frames 73 and 74 can be enlarged or reduced. When the skill frames 73 and 74 are thus positioned, a command to start evaluation is sent through the input 62 such as the keyboard or the mouse.

Upon receiving the command, for each of the tracks, a computing circuit 66 determines a score of the procedure. The score is calculated using a ratio (i.e., percentage) of a time in which the marker 59 is included in the regions corresponding to the rectangles of the skill frames 73 and 74 (or the time in which the marker 59 is positioned outside the regions corresponding to the rectangles) to the entire time taken in drawing the tracks. This score together with the content and conditions of the procedure, including the heights and positions of the table and the chair, may be output and, if necessary, printed on a paper by the output 69 such as a printer. Preferably, the score and the like are indicated on the display 68.

In the foregoing description, the evaluation computing is started after the positions of the skill frames 73 and 74 have been determined, but it may be started upon showing the skill frames on the display. This method makes it possible to determine a position of the skill frame where the highest score can be obtained, while moving the skill frame, so that the reliability of the evaluation is improved.

In case where the markers are applied to a plurality of positions as mentioned above, it is preferable to show the tracks corresponding to the markers in different colors, different kinds of lines or lines with different widths. Particularly, in case where a plurality of markers are positioned near to each other and where it becomes difficult to find out which track represents which mark, it is preferable to distinguish the plurality of tracks by colors.

The skill frame may have a plurality of concentric frames, i.e., windows. For example, in the embodiment shown in FIG. 11, the skill frame has two concentric frames of two large and small concentric rectangles, i.e., windows, 75a and 76a (75b and 76b). In this instance, the region inside the small rectangle 75a (75b) is discriminated as a region for reference skill ARa1 (Arb1); the region between the inner small rectangle 75a (75b) and the outer large rectangle 76a (76b), as a region for acceptable skill ARa2 (ARb2); and the region outside the large rectangle 76a (76b), as a region for unacceptable skill ARa3 (ARb3), and a ratio of the time while the marker 59 is included within each of the regions is calculated. In this instance., the reliability of evaluation is further improved. By using the time ratio as above, it becomes easy to rank the skill as shown in the right column of the table in FIG. 12 (e.g., 0, 1 or 2 skill level).

When the same procedure has been done a plural number of times, the results for a certain procedure may be selectively displayed together with its scores and dates. This allows the performer to understand his/her improvement of skill easily.

The sizes of the skill frame may be changed according to the procedure. In addition, the shapes of the skill frame is not limited to rectangles, and they may be changed to, for example, circle or ellipse according to the procedure.

Figure 13:
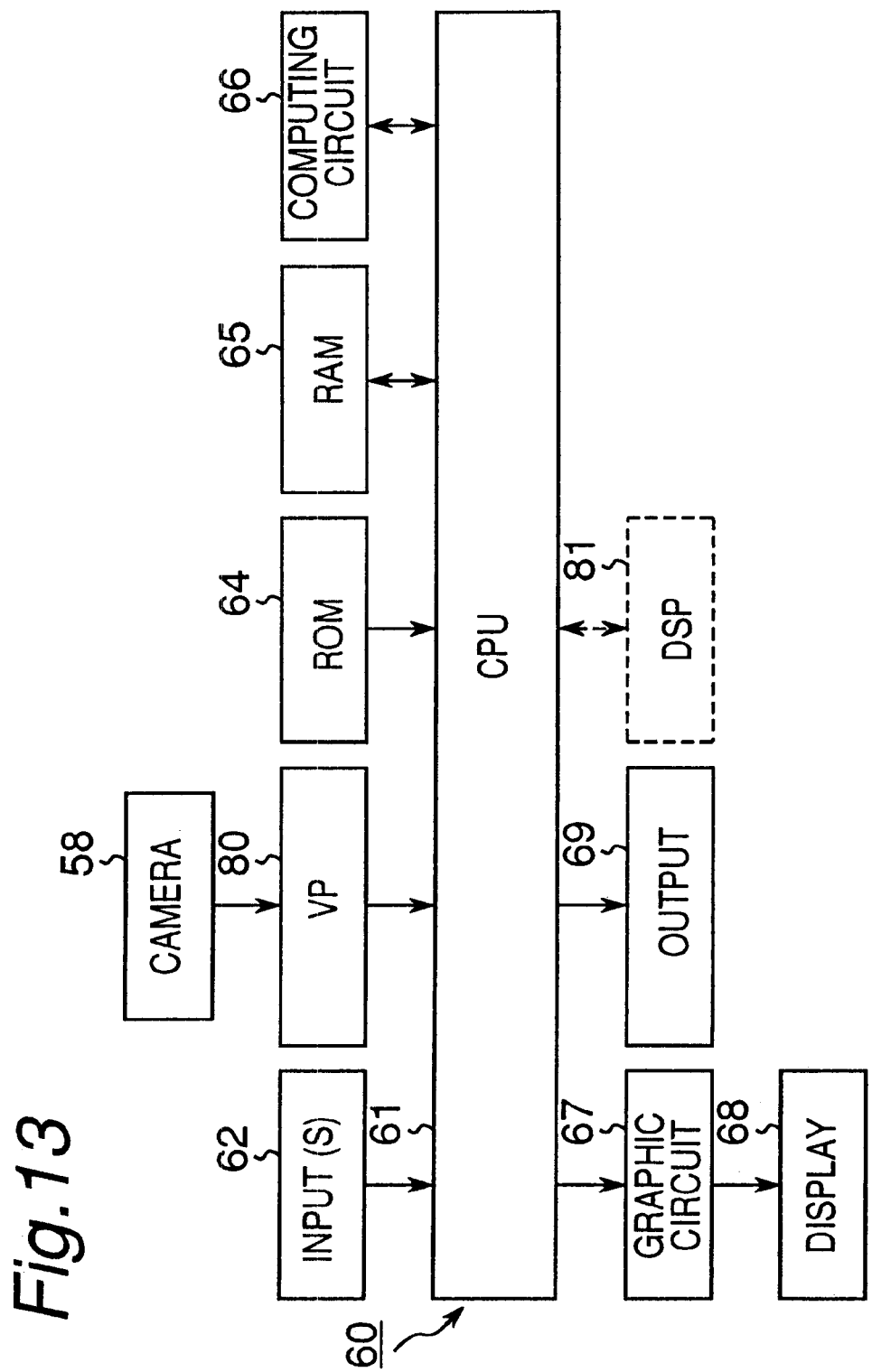
FIG. 13 is a block diagram illustrating another mode of the data processing system.

In the previous embodiment, the VCB 63 generates the X-Y coordinate data of the marker 59 from the output of the camera 58. However, the present invention is not limited to this. For example, as shown in FIG. 13, a video processor VP 80 may be used instead. In this instance, the VP 80 converts the signal from the camera 58 into a digital signal and then separates the digital signal into image data of a marker and other image data. Also, the VP 80 generates X-Y coordinate data from the image data representing the track of the mark.

The separation of the digital signal and also the generation of the X-Y coordinate data may be made in another device other than VP 80 or the VCB 63. For example, as shown in FIG. 13, a digital signal processor 81 is provided to process the digital signal from VP 80 or VCB 63 into image data and then X-Y coordinate data. Alternatively, this process can be performed at the calculation circuit 61. It should be noted that any one of DSP 81, VP 80 and VCB 63, due to its significant process speed, is preferably used rather than calculation circuit 61.

Although in the previous embodiment the track of the point indicator or mark captured by the camera 58 is continuously displayed on the display 68, it may be displayed by using a motion capture technique. The motion capture technique has been used in a golf swing reproduction in which a motion of a golf club together with a golf player is intermittently displayed. With this technique, a motion of a specific portion in the captured image, e.g., instrument or the performer, can be displayed on the display. An ordinary video camera may be used for the image pickup. In this instance, a series of images or frames captured by the video camera are transmitted continuously into the data processing system when each of which is digitized for picking up the image of specific portion.

Figure 14:
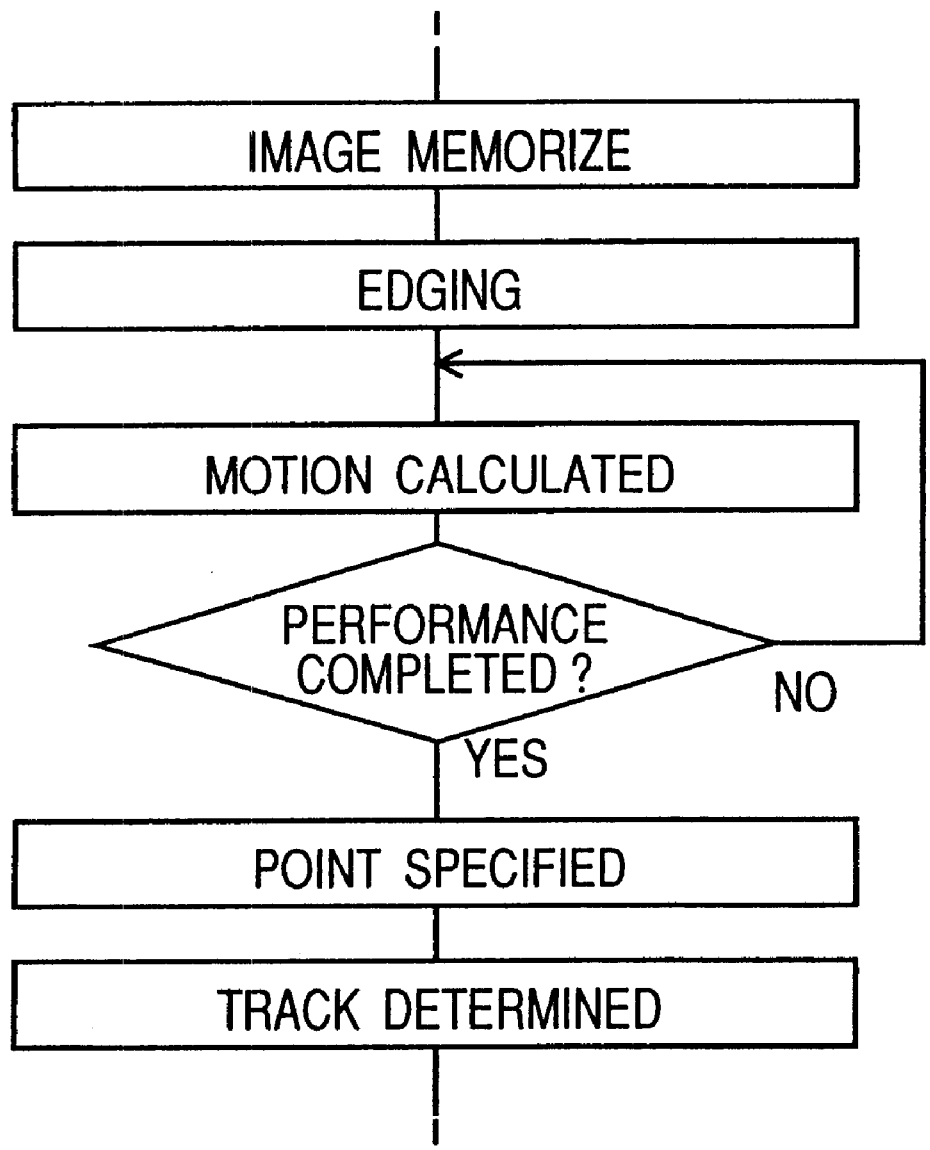
FIG. 14 is a flowchart illustrating another control of the data processing system.

Specifically, as shown in FIG. 14, in the data processing system, initially the image of the specific portion is memorized, for example, in the VCB 63. Then, a peripheral edge of the specific portion is determined. Normally, this process is referred to as "edging". In the edging, for each pixel in the image, a magnitude of the corresponding signal is compared with that of the neighboring pixel and, then, a magnitude difference therebetween is determined. Then, using magnitude differences, pixels having greater magnitude difference are determined on the periphery of the portion. This edging is performed for each frame of the images continuously captured during the procedure and, thereby, the motion of the specific portion is obtained. The above process is carried out in the performance. Therefore, by pointing out a certain point in the specific portion, a motion of the certain point, i.e., its track, can be determined.

Although the present invention has been fully described with the dental care procedure and its system, the present invention may be applied to other health care procedures such as medical and surgical procedures.

What is claimed is:

1. A system for use in skill acquisition, transfers and verification for performer, comprising:
   (a) a simulated object to which said performer would perform clinical procedure;
   (b) an image pickup which picks up an image of a point indicator provided on said performer or an instrument that said performer handles, and then generates an image signal corresponding to said picked-up image, while said performer provides said simulated object with said procedure;
   (c) an image processor which processes said image signal generated by said image pickup and generates data for showing a movement of said point indicator on a two-dimensional coordinate system; and
   (d) a display which shows tracks of the point indicator by using said coordinate data.

2. A system according to claim 1, further comprises at least one light source which directs light toward said simulated object.

3. A system for use in skill acquisition, transfers and verification for performer, comprising:
   (a) a simulated object to which said performer would perform clinical procedure;
   (b) at least one light source which directs light to said simulated object;
   (c) a position indicator made of light reflecting material, said position indicator being provided on said performer or an instrument that said performer handles for reflecting said light from said light source;
   (d) an image pickup which picks up an image of a point indicator and then generates an image signal corresponding to the picked-up image while said performer provides said simulated object with said procedure;
   (e) an image processor which processes said image signal generated by said image pickup and generates data for showing tracks of said point indicator on a two-dimensional coordinate system; and
   (f) a display which shows said tracks of the point indicator by using the coordinate data.

4. A system according to claim 1, wherein said image pickup is a video camera, and said image-processor is a video processor which processes said image signal and generates binary data corresponding to said tracks of said point indicator and generates data for showing said tracks of said point indicator on said two-dimensional coordinate system by using said binary data.

5. A system according to claim 1, further comprising
   a base; and
   an elevating portion supported on said base so that said elevating portion moves ups and downs on said base;
   said elevating portion carries said simulated object and a holding member equipped with light source, image pickup and the instrument holder, so that said light source, said image pickup and said instrument holder moves ups and downs with said elevating portion.

6. A system according to claim 5, further comprising
   a chair having an arm horizontally extending from a vertical line passing through a mouth in said simulated object supported on said elevating portion and supported rotatably about said vertical line, and a seat mechanically connected with said arm so that said seat moves ups and downs relative to said arm and to and from said vertical line, wherein said chair cooperates with said base to define a space therebetween in which said performer on said seat can move his/her feet freely.

7. A system according to claim 6, further comprising
   a controller which controls an elevation of said elevating portion and said instruments that said performer handles;
   a head rest rotatably mounted about a horizontal axis for supporting said simulated object; and
   means for displaying and memorizing said elevation of said elevating portion, a rotational angle and horizontal and vertical movements of said seat, and a rotational angle of said head rest.

8. A system according to claim 6, wherein
   said light source has two lamps mounted over said simulated object so that said two lamps direct light to said mouth of said simulated object from opposite directions; and
   said image pickup is positioned between said two lamps.

9. A method for use in skill acquisition, transfers and verification for performer, comprising the steps of:
   (a) providing a simulated object to which said performer would perform clinical procedure;

(b) picking up an image of a point indicator provided on said performer or an instrument that said performer handles, and then generating an image signal corresponding to said picked-up image, while said performer provides said simulated object with said procedure;

(c) processing said image signal generated by the image pickup and generating data for showing a track of said point indicator on a two-dimensional coordinate system; and (d) displaying said track of said point indicator by using the coordinate data.

10. A method according to claim 9, further comprising the steps of:

storing data of a frame in a first memory;

displaying said frame;

moving said frame to superimpose said frame on said tracks of said point indicator;

calculating a ratio of a time in which said point indicator is within a region corresponding to said frame to a time taken in picking up said point indicator; and displaying said ratio.

11. A method according to claim 10, wherein said frame displaying on said display has a plurality of windows having the same center but different sizes so as to stepwise evaluate procedures made by said performer, wherein said ratio of said time while said tracks the point indicator stay within each of regions enclosed by said plurality of windows to said time taken in picking said point indicator up is calculated and then displayed.

12. A method according to claim 11, wherein a plurality of ratios for a plurality of performers are stored in a second memory, and said plurality of said ratios stored in the second memory are displayed.

* * * * *